Sept. 6, 1960 H. E. MUELLER 2,951,336
CHAMBER WALL CASTING PROCESS AND ASSEMBLY
Filed Aug. 8, 1956 2 Sheets-Sheet 1
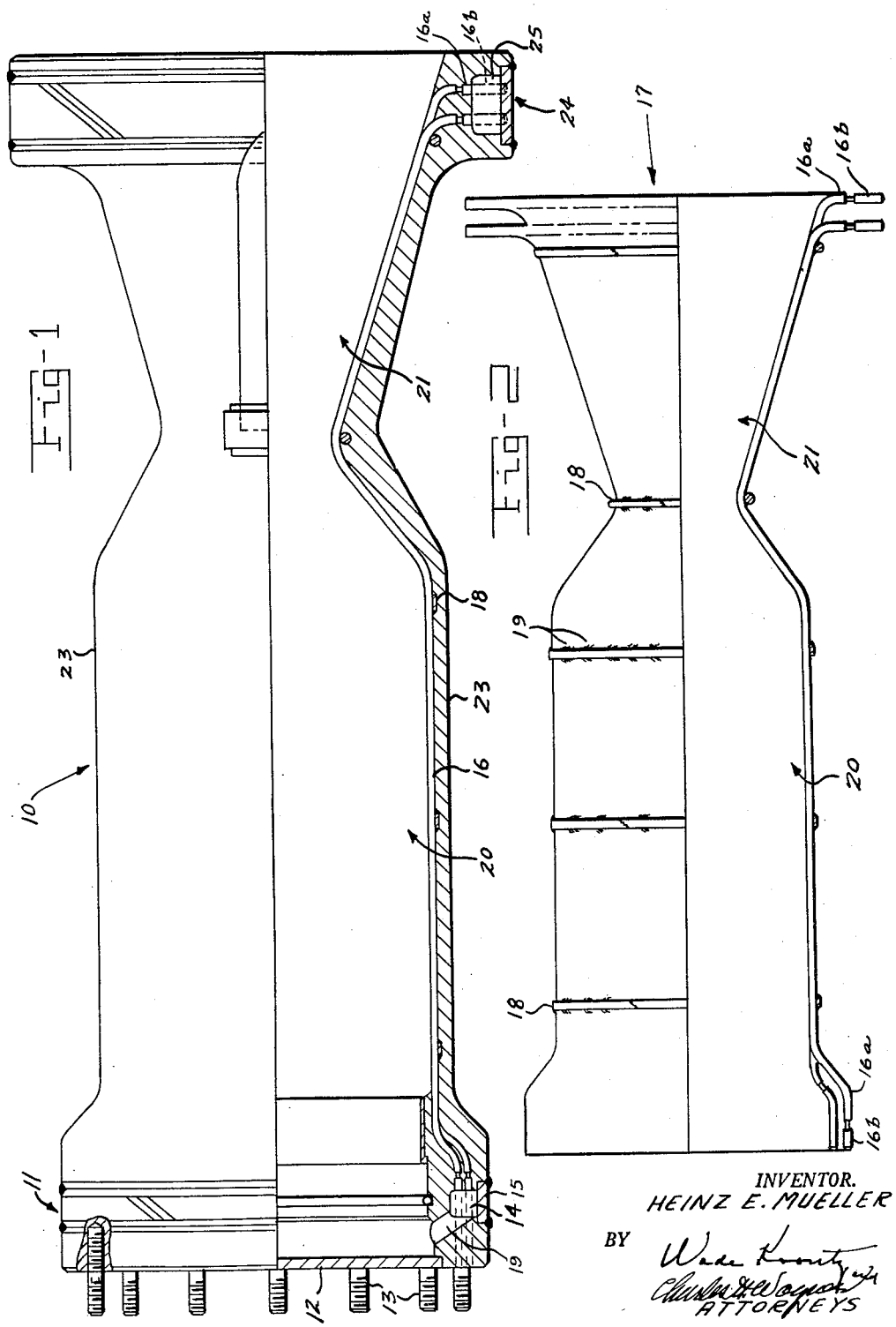
INVENTOR.
HEINZ E. MUELLER
BY
ATTORNEYS Sept. 6, 1960      H. E. MUELLER      2,951,336
CHAMBER WALL CASTING PROCESS AND ASSEMBLY
Filed Aug. 8, 1956      2 Sheets-Sheet 2

INVENTOR.
HEINZ E. MUELLER
BY
ATTORNEYS

United States Patent Office 2,951,336
Patented Sept. 6, 1960

2,951,336

CHAMBER WALL CASTING PROCESS AND ASSEMBLY

Heinz E. Mueller, Lockport, N.Y., assignor to the United States of America as represented by the Secretary of the Air Force Filed Aug. 8, 1956, Ser. No. 602,947

6 Claims. (Cl. 60—35.6)

This invention relates to a chamber wall assembly for rocket motors or the like and the method of making the same, and more particularly, to a thrust chamber wall assembly and the process for combining a heavy-walled section with a thin-walled cooling jacket forming the inner wall structure of the chamber wall.

In the operation of rocket motors over extended periods of time, the thrust chamber wall structure primarily must be capable of withstanding high tensile stresses and pressures, yet must permit high heat transfer rates therethrough in order to induce most efficient cooling of the rocket motor. Unfortunately it has been found difficult to efficiently and inexpensively construct a wall structure combining the favorable properties of high thermal conductivity and high strength at elevated temperatures. One effective means of cooling the rocket motor is to provide cooling passages extending the length of the rocket motor wall through which coolant fluid is circulated to absorb the heat given off by the combustion gases. Usually the coolant passages are comprised of a series of tubular members either helically wound through the wall structure or passed axially along the walls to form a cooling jacket. However, the tubes themselves must be thin-walled to be highly conductive, yet must be supported in some way to withstand high pressure loads, and further must be sealed off to prevent the escape of hot combustion gases through the wall structure.

To adequately support and seal the coolant passages, it has been proposed to insert a light metallic alloy filling between the thin walled tubes, normally by a welding or spraying process; however, such a process is time consuming, particularly in order to form a consistent layer over the tubes which is of a sufficient thickness to withstand high pressures. Also, it is common to enclose the tubes by means of collars or flanges clamped or welded together to embrace the tubes or cooling passages. This has been found impracticable due to the difficulty of forming a gas-tight seal between the tubes while at the same time making the rocket motor lightweight and compact. Consequently, it is the primary object of my invention to provide an inexpensive, rapid, and efficient process of combining a plurality of thin-walled coolant passages with a heavy-walled outer section in such a way that gases are completely confined within the wall structure, yet a resultant wall structure is formed which is capable of withstanding high pressure loads and offers high thermal conductivity over extended periods of time.

It is another object to provide an inexpensive and efficient process for making a compact, lightweight thrust chamber wall structure comprised of a substantially integral wall assembly of separate metallic alloy sections.

It is another object to provide a process utilizing a cooling jacket assembly as a support within a casting mold for the casting of an outer section thereto so as to contact the outer peripheral surface of the cooling jacket over its entire length in direct heat conducting and pressure resistant relation.

A further object is the method of forming a rocket propellant combustion chamber having a plurality of thin-walled tubes disposed in juxtaposed, side by side relation and gradually flattened intermediate their ends at the necked-down portion of the combustion chamber to dispose the opposite sides of the adjacent tubes in abutting relation throughout the length of the combustion chamber, and casting a form-sustaining metallic shell over the exterior of the combustion chamber formed by the tubes to form a homogeneous combustion chamber having the tubes lining the interior thereof and extending longitudinally of the combustion chamber in radial planes through the central axis of the combustion chamber.

It is still a further object to provide a regeneratively cooled rocket motor wall assembly in which the coolant passages are combined with a protective casing so as to form a sealed cooling structure capable of withstanding high tensile stresses and pressures.

In accordance with the preceding objects and advantages and to overcome the past difficulties as set forth, my invention offers substantial improvements in the art of thrust chamber wall construction in the protection and housing of a plurality of specially selected and assembled thin-walled cooling passages by means of a novel casting process in which the assembled cooling passages are supported within a casting mold to form an inner lining, and a lightweight metallic alloy is cast to the outer peripheral surfaces of the assembled tubes to form a continuous, heavy-walled section. In this way, a rocket motor wall structure is formed requiring a minimum number of steps in carrying out the process and makes possible the formation of a chamber wall combining the most favorable characteristics of different specially selected metallic alloys in substantially integral relation.

Other advantages and objects of the invention will be more fully understood by reference to the drawings in which:

Fig. 1 is a quarter-sectional view of the thrust chamber assembly of a rocket motor;

Fig. 2 is a side view partially in section showing the cooling jacket assembly;

Figure 4:
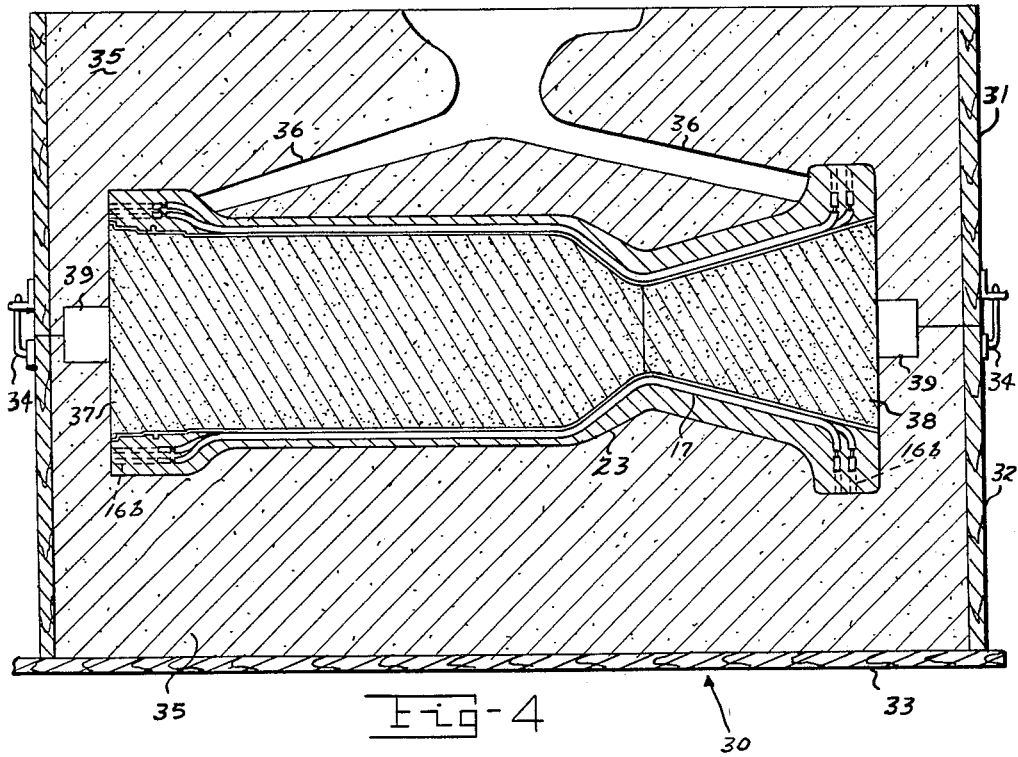
Fig. 4 is a section view illustrating the casting mold, housing the assembled cooling jacket and outer shell.

Referring more particularly to the drawings, in Fig. 1 there is shown a thrust chamber assembly 10 made up of a head portion at its forward end which includes broadly a cylindrical, forward manifold ring portion 11 for attachment of injector plate 12 by means of suitable studs 13 so as to close off the foward end of the thrust chamber assembly 10. Circumferentially extending about the periphery of the raised shoulder portion 11 is an injector propellant manifold or passage 14, and a plurality of thin-walled tubes or conduits 16 are passed rearwardly from the inlet manifold section 14 and extend the entire length of the thrust chamber assembly 10 so as to form a tube assembly 17 constituting an annular row of axial flow coolant passages defining the inner wall structure of a combustion chamber 20 and nozzle section 21 of the thrust chamber assembly. Enclosing the tube assembly 17 is a continuous outer heavy walled section 23 intimately contacting the tube assembly 17 throughout the combustion chamber 20 and nozzle section 21 and formed integrally with the forward manifold ring 11 and rearward manifold ring 24 which houses the propellant supply manifold 25 circumferentially extending about the manifold ring 24. The tube assembly 17 is terminated at the entrance to the fuel supply manifold 25 as shown in Fig. 1.

Figure 3:
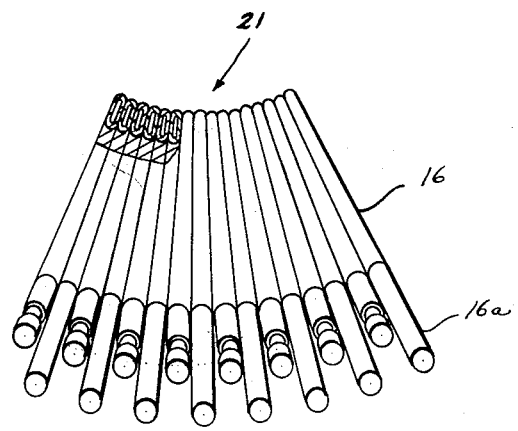
Fig. 3 is an end view of Fig. 2 showing the relative disposition of the assembled thin-walled tubes which form the cooling jacket and partially sectioned to show the flatted tubes in the nozzle section.

As shown more clearly in Figs. 2 and 3, each thin walled tube 16, preferably of lightweight metallic alloy composition, such as stainless steel, is bent to describe the desired contour of the combustion chamber 20 and nozzle section 21. Thus each tube extends rearwardly parallel to the axis of the combustion chamber 20, converges inwardly toward the longitudinal axis of the thrust chamber to form the throat section of the nozzle and then diverges rearwardly away from the axis of the thrust chamber assembly. The forward and rearward ends 16a of each tube are bent outwardly so as to extend into the forward and rearward manifold ring portions.

In assembly, the tubes 16 are axially aligned and gradually flattened on their opposite sides in the necked-down or nozzle portion of the thrust chamber to be in juxtaposed, side-by-side relation throughout substantially the length of the combustion chamber and are wrapped to form a tubular bundle by means of wire straps 18 which are tack-welded as at 19 to the outer surfaces of each tube at spaced intervals along the length thereof. By welding the straps to each tube and bending the straps to form a circular band or hoop, then welding each strap together at its free ends, the tube assembly is thereby constrained into a tight, annular bundle of tubes. Of course, the wire straps 18 serve mainly to maintain the tube assembly in the desired configuration prior to the casting process, and are not expected to resist any outward pressure loads applied to the tube assembly. However, in combining the tubes in tight fitting annular relationship, the straps are useful in preventing any buckling or collapse of the tube assembly due to the differential thermal expansion of the tube bundle and the casting.

It is to be noted that each alternate tube is varied in length so that, in bending of the ends, the tube assembly is staggered at its forward and rearward ends for connection into the propellant manifolds. In the casting process, which will be described, the staggered relation between the tubes is advantageous in forming a secure connection between the tube assembly and outer heavy wall section.

Furthermore, each tube is flatted, as shown in Fig. 3, in the area of convergence and divergence throughout the throat section in order to compensate for the decrease in cross sectional area at this point. In addition, such a flatted construction in the throat section will increase the velocity of the coolant-propellant through the tubes to provide the added coolant flow necessary to counteract the increased liberation of heat at this point, since the maximum combustion gas flow per unit area occurs in the throat section.

The casting process is carried out as follows: In Fig. 4, a flask 30 is shown having a cope portion 31 and a drag portion 32 mounted on a molding board 33. In making the mold a pattern (not shown) is formed to correspond with the desired outer configuration of the thrust chamber wall assembly, allowance being made for contraction of the metallic alloy in cooling. The lower half of the pattern is first placed on the molding board 33, and the drag is placed over the board with the pins 34 down. A porous molding sand 35, preferably greensand, is then filled and rammed firmly into the drag 32. After the ramming is completed and any excess sand leveled off, the lower half of the mold is turned over and the cope placed into position over the drag. Sand is then rammed into the cope portion about the upper half of the pattern, a forked sprue pin having been placed to extend adjacent each end of the pattern to form sprue openings 36 for pouring the molten alloy. Both the cope and drag portions should be vented to permit escape of the gases during the casting process.

The mold is finally completed by removing the pattern and the sprue pin and funneling the top of the sprue openings as shown. The tube ends are extended as at 16b so as to abut the cavity wall during the casting process, and the open ends of the tubes at 16a and 16b are plugged, such as by use of suitable weld, in order to prevent influx of any of the molten metal in the tubes and to prevent metal chips from entering the tubes in machining out the manifolds. The tube assembly 17 is then supported within the cavity formed by the pattern by means of dry-sand core sections 37 and 38 inserted into the combustion chamber 20 and nozzle section 21 respectively, the attached dowels 39 acting to support the cores 37 and 38 and tube assembly 17 in spaced relation with respect to the cavity wall.

A lightweight molten metallic alloy, preferably an aluminum alloy, is then poured into the remaining cavity around the outside of the tube assembly to form the outer heavy walled section 23, care being taken in filling the cavity to prevent uneven shrinkage of the aluminum alloy about the tube assembly. In that the aluminum alloy will contract while cooling, the outer heavy walled section will therefore tend to draw tightly about, and fill around the outer curvature of each tube. In this way, a substantially integral wall structure is formed completely enclosing the outer surface of the tube assembly and forming the forward and rearward manifold rings 11 and 24 respectively which completely surround the spaced, or staggered tube ends. The stainless steel tubes, having a melting point higher than that of the aluminum alloy outer section, will not be affected by the high temperature molten alloy poured into the cavity.

Upon solidification and cooling of the casting the completed wall structure is then removed from the molding sand, and the core sections 37 and 38 together with the dowels 39 are withdrawn from the chamber assembly. The entire outer section is then machined, including the manifold openings which are formed out of the forward and rearward manifold rings 14 and 25, and the tube ends at the entrance to the manifolds are drilled out.

Manifold covers 15, shown in Fig. 1, are placed over the manifold sections 14 and 25, respectively, to enclose the coolant-propellant manifolds, and injector passages 19 are drilled into the inner wall of the forward manifold ring 11 to interconnect the injector manifold 14 and the injection section (not shown) disposed in front of the combustion chamber. The injector plate 12 is then attached to the forward end of the thrust chamber assembly by means of the studs 13. As the relative disposition and arrangement of the remainder of the rocket motor, such as the injector system, and propellant supply lines, form no part of this invention, they are not described.

Of course, other suitable materials can be used in the casting process as explained so long as the tubes have a melting point sufficiently high to prevent melting by the molten metal when poured. In addition, it would be possible to use substantially the same material in the tube assembly and outer section and provide a sufficiently thick surface on the outer wall of the tube assembly so that the molten metal will merely fuse with the outer surface and not affect the tube assembly itself. In the preferred form, it has not been found necessary to fuse the tube assembly and outer sections together in order to obtain a gastight seal due to the complete inclosure of the tubes by the outer section and the closed annular arrangement of the tubes themselves. Furthermore, it is not my intention to limit the casting process or construction as set forth to rocket motor wall assemblies, but has been found to be advantageous in other arts, such as the construction of heat exchange wall sections.

Before firing of the rocket motor takes place, a ceramic coating is brushed over the inner wall structure of the combustion chamber and nozzle section to provide additional protection for the cooling passages. The application of the ceramic coating is repeated before each firing operation to completely insure against any gas leakage through the cool surface.

In the firing operation, oxidizer or fuel is used as the coolant-propellant and is conducted by means of a propellant supply system into the manifold 25 through the cooling jacket or tube assembly 17 and propellant manifold 14 for injection and ignition in the combustion chamber 20.

The heat of reaction developed in the combustion chamber is initially absorbed by the gaseous film layer on the inside of the chamber wall, then experiences a small temperature drop through the thin-walled tubes followed by a substantial drop across the path of the coolant-propellant. Of course, the highest heat transfer intensity occurs at the throat section; however, due to the added velocity of the coolant at this point and the fact that the coolant is at a lower temperature at the rearward end of the combustion chamber, adequate cooling is accomplished.

The stresses developed during the firing operation due to the internal pressure of the combustion gases are carried by the outer shell. The differential in thermal expansion between the tube assembly and casting tends to buckle the tubes; however, the tight annular formation of the tubes together with the stiffening bands 18 can safely withstand this thermal expansion differential.

While I have disclosed a preferred embodiment of my invention, it is obvious that certain modifications may be made, as for instance, in the manner of carrying out the casting process, without departing from the spirit of my invention as described in the appending claims.

What is claimed is:

1. A method of constructing a rocket motor thrust chamber of the type having a head portion and an end portion spaced from the head portion with annular fluid passages in the head and end portions and coolant tubes arranged in parallel relation formed so as to constitute the inner wall of the thrust chamber and interconnecting the fluid passages in the end portion and head portion, and a continuous, heavy-walled, light metal alloy shell integral with the head and end portions and contacting the tubes over their entire length in heat conducting relation, comprising: making a mold by adapting a pattern into two halves forming a cavity therein conforming to the contour of the head, end and intermediate shell portions, forming a bundle of coolant tubes into a shape defining the inner wall of the thrust chamber, securing said tubes in assembled relation, positioning said tube assembly in the mold cavity and casting a continuous, metal body about the tube assembly by initially mounting the lower half of the pattern and the drag of a two-part molding flask in position on said molding board, firmly packing a porous molding sand into said drag and levelling off any excess sand, reversing the position of the mold so formed, positioning the upper half of the pattern and the cope of said molding flask over said drag, again firmly packing a porous molding sand into said cope around the upper half of the pattern and simultaneously forming sprue openings adjacent each end of the pattern for pouring therein molten alloy.

2. The process of making a thrust chamber wall assembly of a rocket motor in which the rocket motor includes an injector propellant mainfold, a propellant supply manifold, and a connected combustion chamber and nozzle portion, said process consisting essentially of shaping each of a plurality of elongate heat conductive conduits to extend axially throughout substantially the length of said rocket motor so as to correspond with the desired contour of the connected combustion chamber and nozzle portions; bracing said conduits in parallel alignment to form a tubular bundle; applying a ceramic coating to the combustion chamber side of said tubular bundle; making a mold in which the pattern is adapted to the desired exterior manifold and chamber wall configuration and then firmly packed with a sand core; removing the pattern and positioning said tubular bundle in the mold in spaced relation with respect to the outline formed by the pattern; and pouring a molten metallic alloy about the outer surface of the tubular bundle and allowing it to solidify by forming a plurality of sprue openings in the firmly packed sand core of said pattern before removal thereof, funneling the top of said sprue openings, extending opposite ends of said tubular bundle to abut the walls of said chamber wall configuration, and plugging the open ends of said tubular bundle to prevent influx of molten metal thereinto, said tubular bundle forming an inner coolant wall interconnecting the propellant supply and injection manifold portions at each end for the flow of coolant-propellant through said annular jacket.

3. The process according to claim 2, in which said heat conductive conduits are further characterized by being bent at their end portions in staggered relation at the propellant supply and injection manifold portions, and the alternate spaces between said staggered end portions being filled with said molten metallic alloy during the casting process.

4. The process of casting a continuous, heavy-walled section to a plurality of coolant tubes disposed in juxtaposed, aligned parallel relation so as to constitute an inner annular wall structure of the thrust chamber of a rocket motor in direct thermal contact with the interior of said chamber, consisting essentially of assembling thin-walled coolant tubes in longitudinally extending, parallel relation, attaching a plurality of circular, metallic bands about the periphery of the inner annular wall structure formed by said tubes at spaced intervals along the length thereof, forming a cavity within a casting mold corresponding in shape to the desired configuration of the exterior rocket motor, supporting said coolant tubes in inner concentric, spaced relation with respect to the cavity wall so as to define the inner lining of the thrust chamber of the rocket motor, pouring a molten aluminum alloy into the casting mold to fill the cavity surrounding the outer surface of said coolant tubes to thereby form a continuous, heavy-walled section in direct thermal contact with the outer periphery only of said coolant tubes, said coolant tubes being initially supported relative to said cavity wall by a pair of dry-sand core sections positioned respectively within the thrust chamber and nozzle section of the rocket motor to maintain said coolant tubes in spaced relation relative to the wall of the cavity until said molten alloy has been poured therein.

5. The process according to claim 6, in which said coolant tubes are gradually flattened on their opposite sides in the area of convergence and divergence in the nozzle section of the thrust chamber to thereby form a rearwardly convergent and divergent annular wall structure at the rearward end of said rocket motor and compensate for the reduced cross-sectional area and increase the velocity of flow thereat and thus counteract the increased heat transfer throughout the nozzle section.

6. A wall structure for a rocket motor of the type which includes a combustion chamber and associated restricted nozzle section rearwardly extending therefrom, an annular propellant supply manifold and injector propellant manifold at the rearward and forward ends of said rocket motor respectively, said wall structure consisting of a plurality of stainless steel tubes disposed in juxtaposed, side by side relation progressively flattened intermediate their ends adjacent said restricted nozzle section and bent to correspond with the desired contour of the associated combustion chamber and nozzle section to constitute an annular jacket defining the configuration of said combustion chamber and associated nozzle section; a series of metallic hoops secured peripherally about the outer surface of each of said plurality of tubes to constrain said tubes in assembled relation; and a seamless, outer heavy-walled casting in direct contact with the outer surface only of each of said tubes over their entire lengths and formed with the propellant supply manifold enclosing the rearward ends of said tubes to direct coolant fuel through said tubes; and formed with an annular injector propellant manifold enclosing the forward ends of said tubes in communication therewith, and a continuous shell interconnecting said manifolds to thereby co-operate with said annular jacket in conducting heat from said associated combustion chamber and nozzle section and withstanding high-pressure combustion gases.

References Cited in the file of this patent

UNITED STATES PATENTS

| | | |
|---|---|---|
| 1,935,659 | Noack | Nov. 21, 1933 |
| 2,686,400 | Andrus | Aug. 17, 1954 |

FOREIGN PATENTS

| | | |
|---|---|---|
| 188,596 | Great Britain | Nov. 16, 1922 |
| 459,924 | Great Britain | Jan. 18, 1937 |

UNITED STATES PATENT OFFICE
CERTIFICATE OF CORRECTION

Patent No. 2,951,336                 September 6, 1960

Heinz E. Mueller

It is hereby certified that error appears in the printed specification of the above numbered patent requiring correction and that the said Letters Patent should read as corrected below.

Column 6, line 52, for the claim reference numeral "6" read -- 4 --.

Signed and sealed this 11th day of April 1961.

(SEAL)
Attest:

ERNEST W. SWIDER               ARTHUR W. CROCKER

Attesting Officer               Acting Commissioner of Patents